United States Patent [19]
Snell, Jr. et al.

[11] Patent Number: 5,797,649
[45] Date of Patent: Aug. 25, 1998

[54] FOLDING AUXILIARY SEAT FOR A VEHICLE

[75] Inventors: Richard A. Snell, Jr.; Bryan L. Nannet, both of Naperville; Ralph D. Price, Plainfield, all of Ill.

[73] Assignee: Case Corporation, Racine, Wis.

[21] Appl. No.: 759,010

[22] Filed: Dec. 2, 1996

[51] Int. Cl.⁶ .................................................. B60N 2/02
[52] U.S. Cl. ........................... 297/14; 296/63; 297/42; 297/16.1
[58] Field of Search .................... 297/14, 217.7, 297/378.1, 16.1, 42; 296/63, 65.1

[56] References Cited

U.S. PATENT DOCUMENTS

| | | | |
|---|---|---|---|
| 1,583,264 | 5/1926 | Turner, Jr. | 297/14 |
| 1,698,036 | 1/1929 | Trammell | 297/14 |
| 2,397,322 | 3/1946 | McArthur | 297/42 |
| 3,193,848 | 7/1965 | Levy | 297/42 X |
| 4,009,903 | 3/1977 | Manspeaker | 297/14 |
| 4,046,417 | 9/1977 | Beckley | 297/16.1 |
| 4,527,828 | 7/1985 | Groce et al. | 297/14 X |
| 4,993,666 | 2/1991 | Baymak et al. | 297/14 X |
| 5,240,276 | 8/1993 | Coombs | 297/42 X |
| 5,374,106 | 12/1994 | Hoefer | 297/236 |

FOREIGN PATENT DOCUMENTS

| | | |
|---|---|---|
| 0 110 011 | 8/1983 | European Pat. Off. . |
| 0 430 905 B1 | 11/1990 | European Pat. Off. . |

*Primary Examiner*—Peter M. Cuomo
*Assistant Examiner*—Stephen Vu
*Attorney, Agent, or Firm*—Jansson, Shupe, Bridge & Munger, Ltd.

[57] ABSTRACT

A folding seat assembly has a seat mounted for pivoting movement toward and away from a back-support section. The seat includes a first panel and a second panel mounted for pivoting movement with respect to the first panel so that the two-panel seat "folds in half." The seat support pedestal also folds in half and the back-support section pivots for stowage. The stowed, folded seat assembly is nominally one-half of the width of the same seat assembly unfolded for use. A new method for folding an auxiliary seat assembly for stowing includes folding the seat second panel toward the first panel to form a folded seat. The folded seat is then urged against the back-support section and for stowing, both the seat and support section are depressed against the vehicle component, e.g., a fender.

18 Claims, 8 Drawing Sheets

FOLDING AUXILIARY SEAT FOR A VEHICLE

FIELD OF THE INVENTION

This invention relates generally to seats used on land vehicles and, more particularly, to seats of the type configured for only occasional use in such vehicles.

BACKGROUND OF THE INVENTION

In certain types of vehicles, e.g., those used "off-highway," there is only a single seat for the operator. Some users of such vehicles desire or even require that such vehicle be equipped with an auxiliary seat of some sort for a "co-driver" or other person occupying the vehicle cab with the driver. Such auxiliary seats are more common in Europe than in the United States.

While an auxiliary seat may be a desirable adjunct to a vehicle having only a single seat, such a seat is not entirely free of disadvantages. Chief among them is impairment of movement to, from and in the cab. Off-highway vehicle cabs tend to be a bit crowded and any extra equipment in a cab, especially equipment having the not-insignificant size and bulk of an auxiliary seat, impairs one's ability to get into and out of the cab or to move around in the cab.

At least in part because of the limited space in a vehicle cab, product designers developed seats which fold in one way or another. An example of such a seat for an agricultural tractor is shown in European Patent Office (EPO) Publication No. 0 430 905 B1. The one-piece padded cushion (or "flap" as the patent calls it) is attached by a U-shaped element to the tractor mudguard. Such cushion hangs vertically when not in use and swings upwardly to rest horizontally atop such mudguard when in use.

EPO Publication No. 0 110 011 B1 shows a driver's seat and a passenger seat foldable with respect thereto. The horizontal cushion of the passenger seat pivots upwardly about a lateral axis to a position against the back of such passenger seat. Such cushion and the back of the passenger seat are then pivoted laterally in unison about a longitudinal axis to a position against the back of the driver's seat.

U.S. Pat. No. 5,374,106 (Hoefer) shows an arrangement similar to that of the EPO '905 publication. The Hoefer auxiliary seat has an outer cushion that folds against and away from a main cushion. Both cushions pivot on a supporting brace plate. U.S. Pat. No. 4,527,828 (Groce et al.) discloses a folding side mounted jump seat for a pickup truck.

While certain of these prior art folding seats have diminished the problem of impairment of movement in a vehicle cab, they have (or seemingly have) introduced new problems. For example, the folding seat shown in EPO Publication No. 0 110 011 B1 stores nicely but leaves the bellows-like support mounted to the cab floor—under foot.

The seat disclosed in the Hoefer patent seemingly requires a horizontal surface for either the in-use or stored positions. The seat disclosed in the EPO '905 publication also requires a horizontal surface when in use. And when stowed, such seat occupies some of the valuable "between-fenderwell" space that would otherwise permit greater freedom of operator movement.

A new folding auxiliary seat assembly which addresses disadvantages of earlier arrangements would be an important advance in the art.

OBJECTS OF THE INVENTION

It is an object of the invention to provide an improved folding seat assembly and related method which overcomes some of the problems and shortcomings of the prior art.

Another object of the invention to provide a folding seat assembly which occupies substantially no between-fenderwell space when stowed.

Another object of the invention to provide a folding seat assembly which requires no horizontal surface for mounting or while in use.

Another object of the invention to provide a folding seat assembly which can readily be mounted to a curved vehicle fenderwell.

Yet another object of the invention to provide a folding seat assembly which meets the currently-applicable standards prevailing in European Economic Community countries.

Another object of the invention to provide a new method for folding a seat assembly which is very compact when stowed.

Another object of the invention to provide a folding seat assembly and related method which substantially avoid impairing movement to, from and within a vehicle cab.

Still another object of the invention to provide a folding seat assembly which is free of any "on-the-floor" obstacle, either when in use or when folded for stowing.

How these and other objects are accomplished will become apparent from the following descriptions and from the drawings.

SUMMARY OF THE INVENTION

The invention involves a folding seat assembly of the type having a seat and a back-support section and wherein the seat is mounted for pivoting movement toward and away from the back-support section. In the improvement, the seat includes a first panel and a second panel mounted for pivoting movement with respect to the first panel. The first panel and the second panel are coupled to one another by a panel hinge extending along a hinge axis.

The first panel and the second panel are substantially coplanar when the seat is unfolded for use and they are substantially parallel to one another when the seat is folded for stowing. And when the seat is folded for stowing, those surfaces which support the seat occupant are spaced from one another. The back-support section is pivotally coupled to a mounting bracket. Such back-support section pivots between a first position for using the seat assembly and a second position for stowing such assembly.

In other aspects of the invention, the seat first panel has a plate (referred to below as a "first plate") extending therefrom. Such plate is attached to the first panel by a hinge-like first panel mounting device for pivoting movement about a device axis. The panels are mounted for simultaneous pivoting movement about a seat axis which is spaced from the device axis. In a highly preferred embodiment, the seat axis and the device axis are slightly angular to one another.

Similarly, the second panel has a plate (referred to below as a "second plate") extending therefrom and attached thereto by a second panel mounting device for pivoting movement about the device axis. The hinge axis (about which the second panel pivots when folded toward and unfolded away from the first panel) and the device axis are angular to one another. Most preferably, such axes are perpendicular to one another.

It is contemplated that the inventive seat assembly is advantageously used with an off-highway vehicle and is mounted on a vehicle component, e.g., on that surface of a fender well which is exposed in the operator's cab. The assembly includes a support pedestal extending between the seat and the vehicle component when the seat is unfolded for use.

The pedestal includes first and second plates, the latter mounted for pivoting movement with respect to the first plate. Those ends of the plates which are upward when the seat is unfolded for use are pivotally mounted on first and second mounting devices, respectively. Such devices are coincident with a device axis. When the seat is unfolded for use or folded for stowage, the second plate pivots on a pedestal hinge extending along a pedestal hinge axis. The pedestal hinge axis and the device axis are angular to one another and in a highly preferred embodiment, are perpendicular to one another.

Another aspect of the invention involves a new method for folding an auxiliary seat assembly for stowing. Such method includes providing a seat assembly having a back-support section and a seat, the latter having a first panel and a second panel mounted for pivoting movement with respect to the first panel. The second panel is folded toward the first panel to form a folded seat and the folded seat is then urged toward the back-support section.

The back-support section, pivotally coupled to the above-noted mounting bracket, pivots between a first position and a second position. When the back-support section is at the first position as a "starting" position, the method includes pivoting the back-support section to the second position.

The seat assembly includes a pivot-mounted support pedestal, also noted above, which extends between the seat and a vehicle component. In a more specific aspect of the method, the folding step is preceded by the step of pivoting the support pedestal to a position substantially parallel to the seat.

Such pedestal includes the first and second plates, the latter mounted for pivoting movement with respect to the first plate. The folding step includes pivoting the second plate toward the first plate. In an installation where the seat assembly is attached to a vehicle component such as a fender well, the method includes depressing the folded seat and the back-support section toward the vehicle component. Most preferably, the folded seat and the back-support section are then secured with respect to the vehicle component.

Other details of the new seat assembly are set forth in the following detailed description and in the drawings.

DETAILED DESCRIPTION OF PREFERRED EMBODIMENTS

Figure 1:
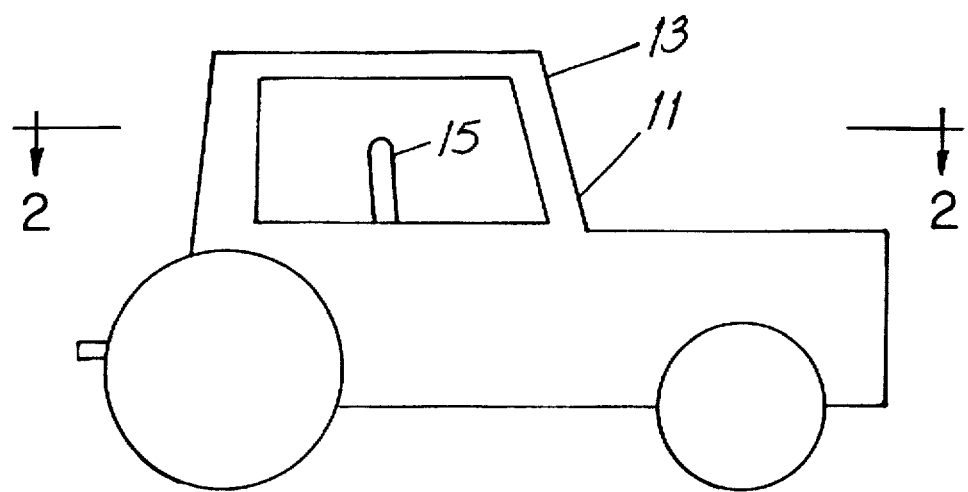
FIG. 1 is a representative side elevation view of mobile machine, e.g., an agricultural tractor.
Figure 2:
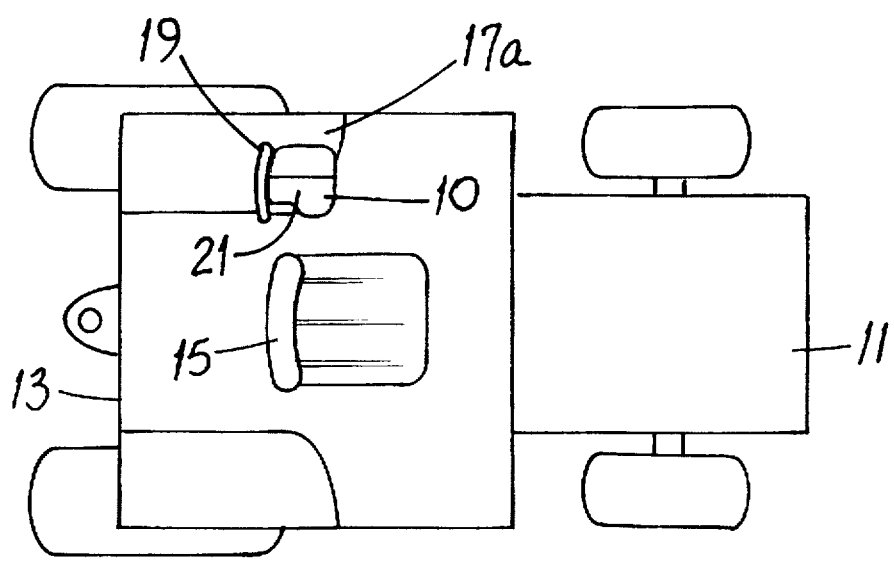
FIG. 2 is a top plan view of the tractor of FIG. 1 taken along the viewing plane 2—2 thereof.
Figure 3:
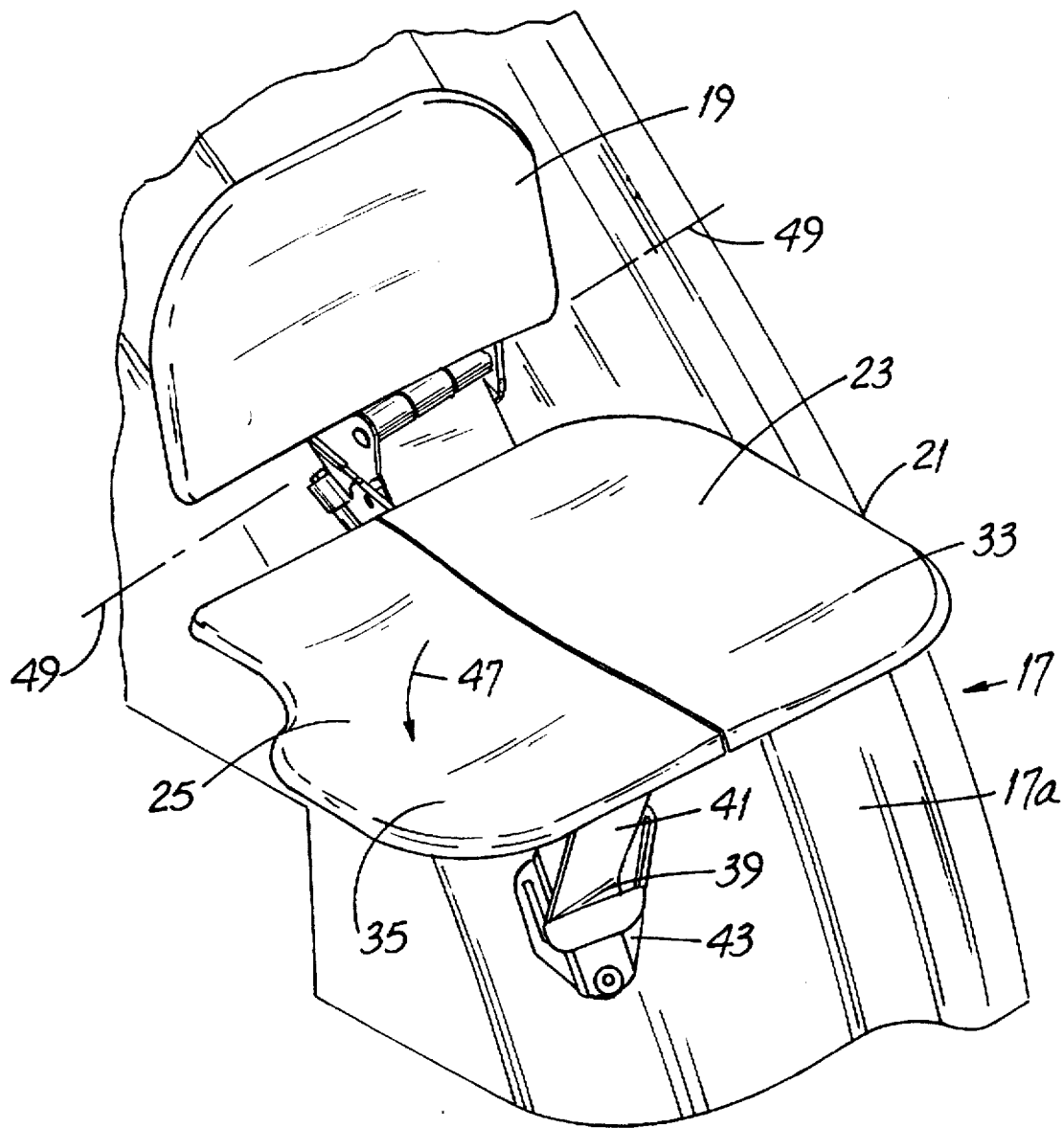
FIG. 3 is a perspective view of the new folding seat assembly unfolded ready for use and shown in conjunction with a vehicle component, e.g., a tractor fender well, upon which such seat is mounted.

Before describing the inventive seat assembly 10 and related method, it will be helpful to have an understanding of but one way in which such assembly 10 may be used. Referring to FIGS. 1, 2 and 3, an exemplary vehicle such as an agricultural tractor 11 has an operator's cab 13 in which is mounted the operator's seat 15. Exposed within the cab 13 is a vehicle component 17 such as a fender well 17a. The left-side fender well 17a is shown in FIG. 3. And while a fender well 17a is an ideal location at which to mount the new assembly 10, another vehicle component 17 may serve equally well, depending upon the specific configuration of the vehicle and its cab 13.

Figure 4:
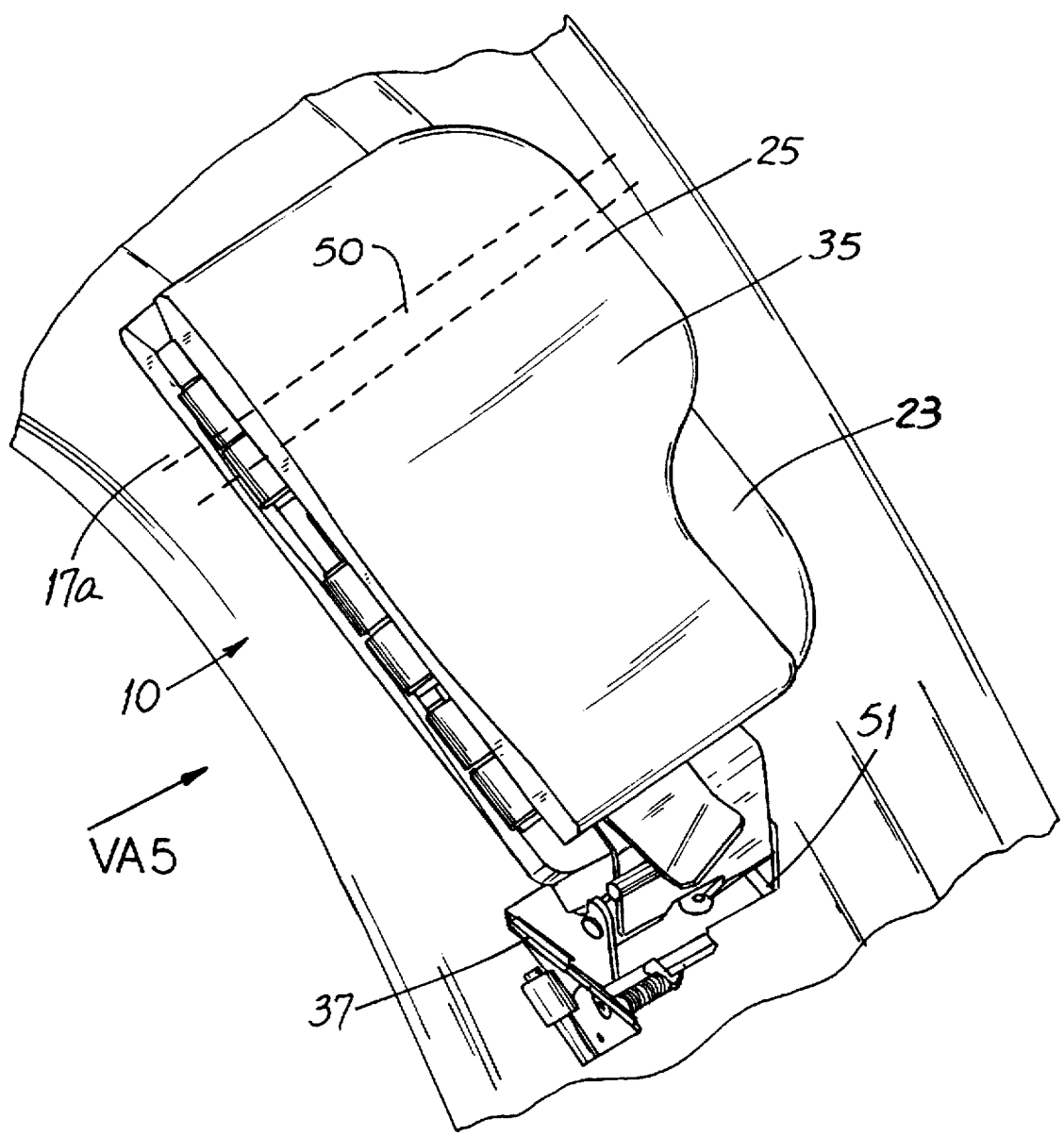
FIG. 4 is a perspective view of the folding seat assembly shown in the folded configuration for stowing and also shown in conjunction with a vehicle component, e.g., a tractor fender well, upon which such seat is mounted.
Figure 5:
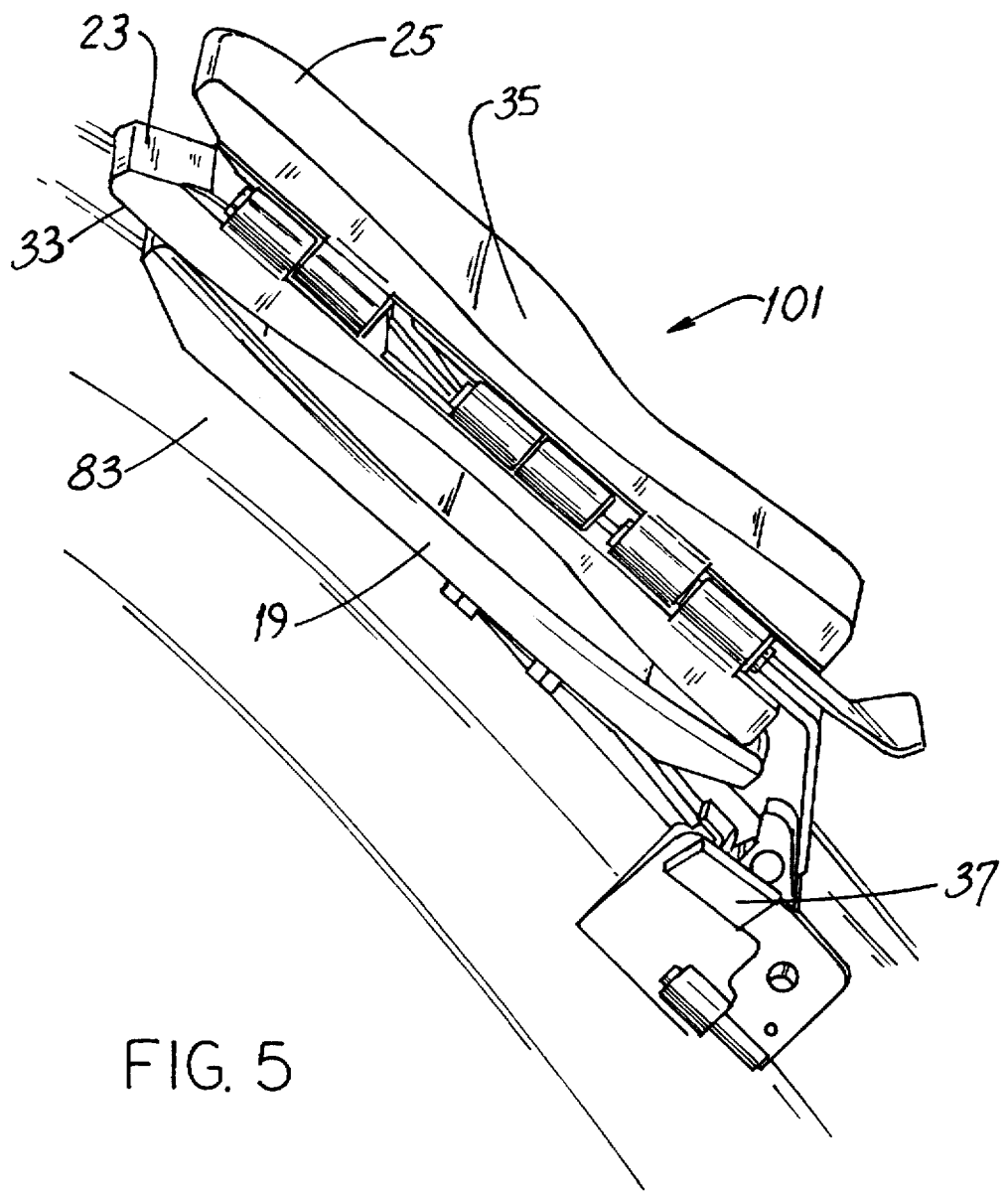
FIG. 5 is an edge view of the seat assembly of FIG. 4 taken along the viewing axis VA5 thereof.

The new seat assembly 10 has a back-support section 19 and a seat 21, the latter comprising seat first and second panels 23 and 25, respectively. When the seat assembly 10 is folded for stowage as shown in FIGS. 4 and 5, the rear side 27 of the back-support section 19 is against or substantially against the fender well 17a. The second panel 25 is toward the viewer (as in FIG. 4) and its area 35 which forms part of the seating surface is visible to the viewer.

Figure 6:
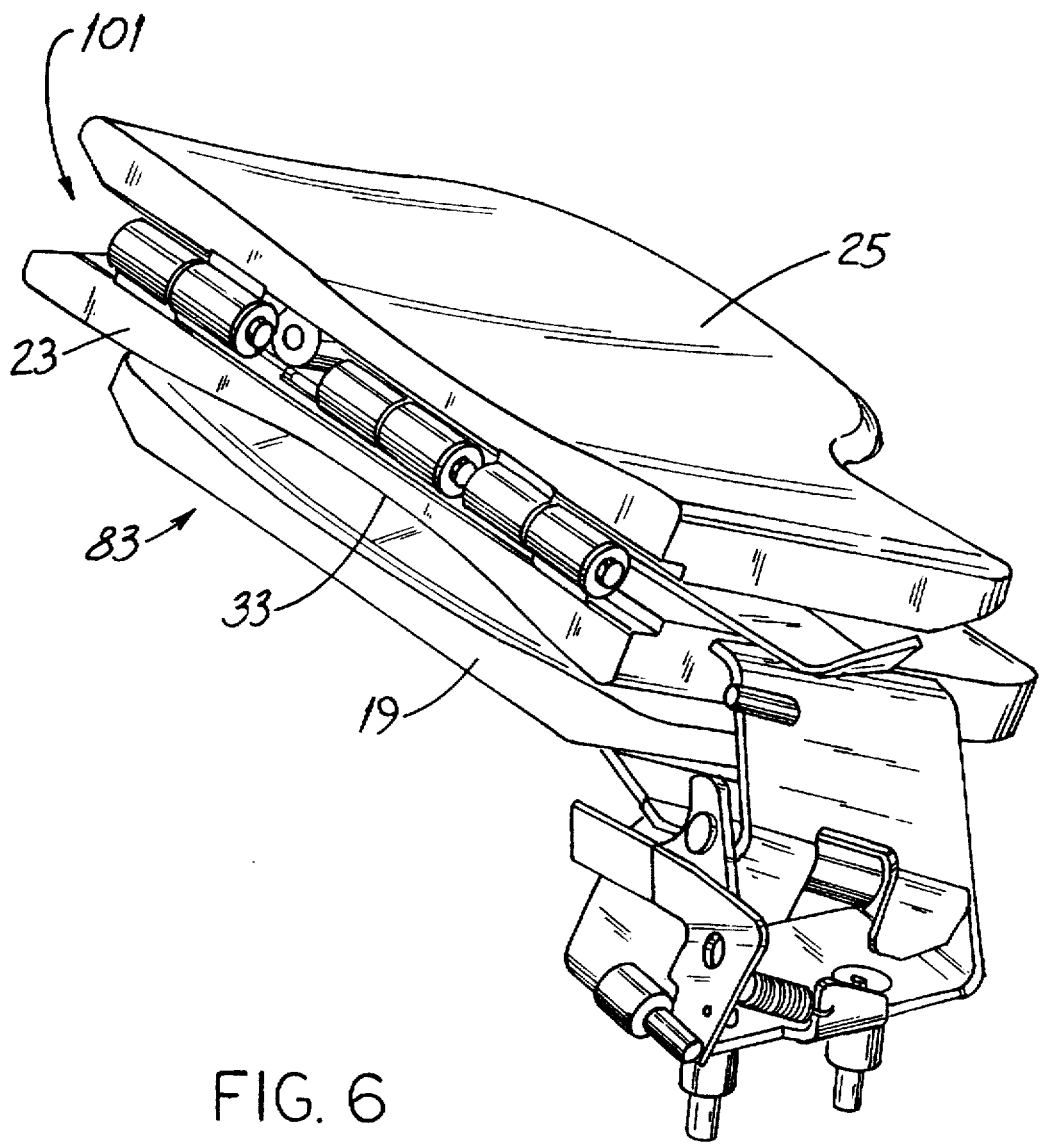
FIG. 6 is another perspective view of the folding seat assembly shown in the folded configuration for stowing.
Figure 8:
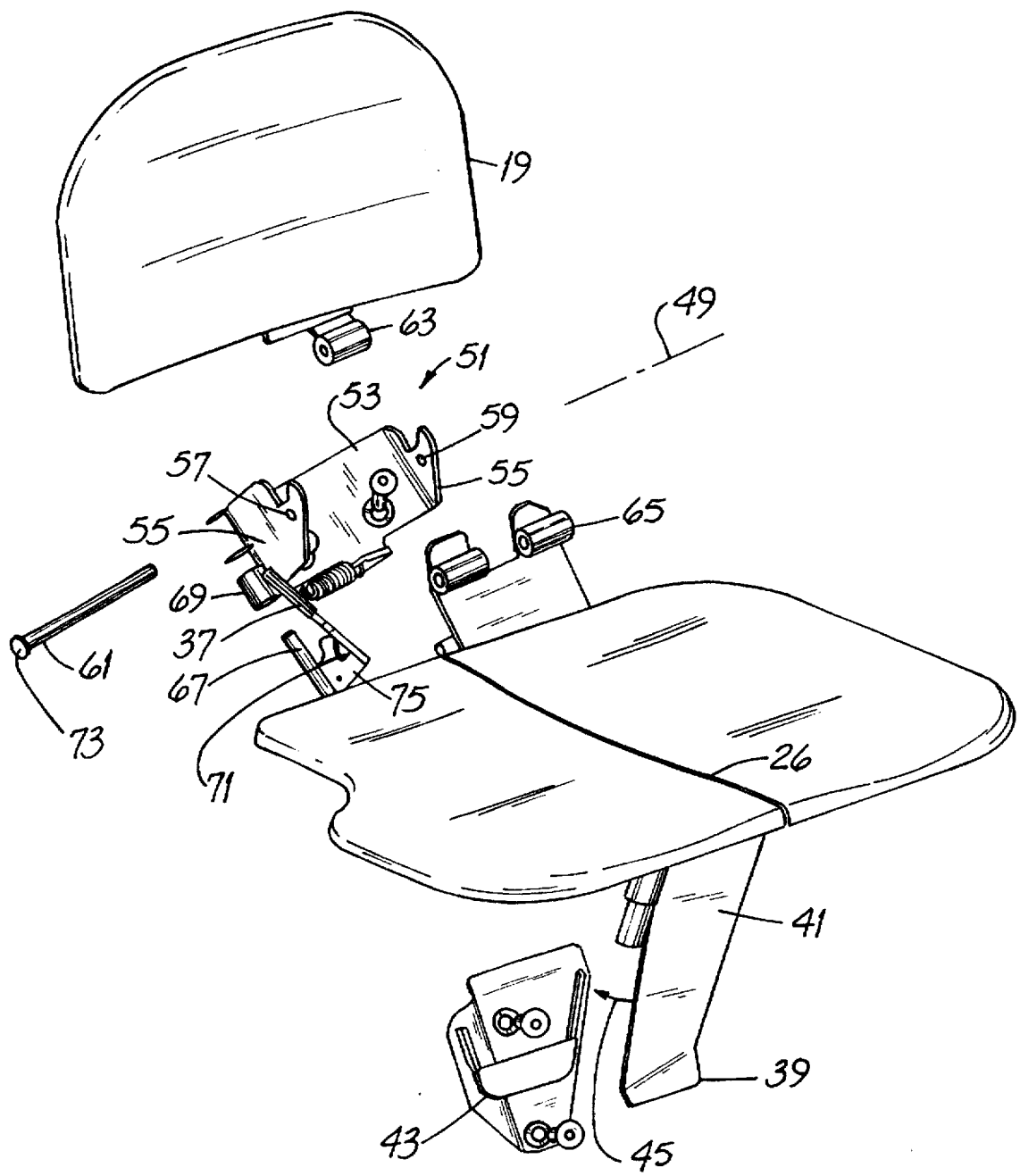
FIG. 8 is an exploded perspective view of the folding seat assembly.
Figure 9:
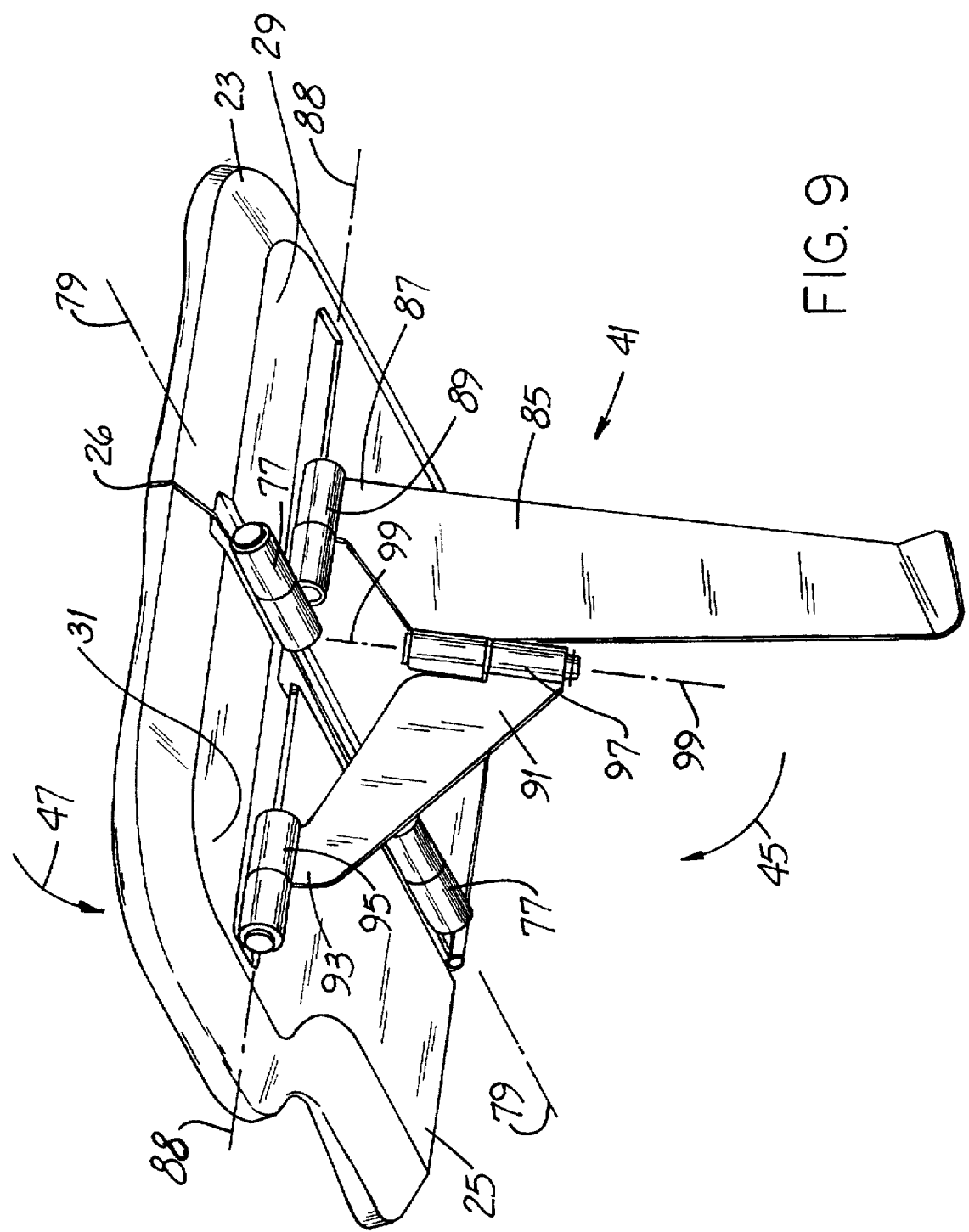
FIG. 9 is an angularly-upward-looking perspective view of the folding seat assembly unfolded ready for use. The assembly back-support section is omitted.

Referring also to FIGS. 6 and 9, the first panel 23 is "sandwiched" between the back-support section 19 and the second panel 25 and in that position, the area 33 of the first panel 23 is against (or substantially against) the back-support section 19. Those areas 33, 35 of the first and second panels 23, 25, respectively, which form the seating surface when the assembly 10 is unfolded for use are spaced from one another. And the undersides 29, 31 of the first and second panels 23, 25, respectively, are against or substantially against one another. And as shown in FIG. 8, the seat first and second panels 23 and 25, respectively, define a parting or "fold" line 26 therebetween.

Figure 7:
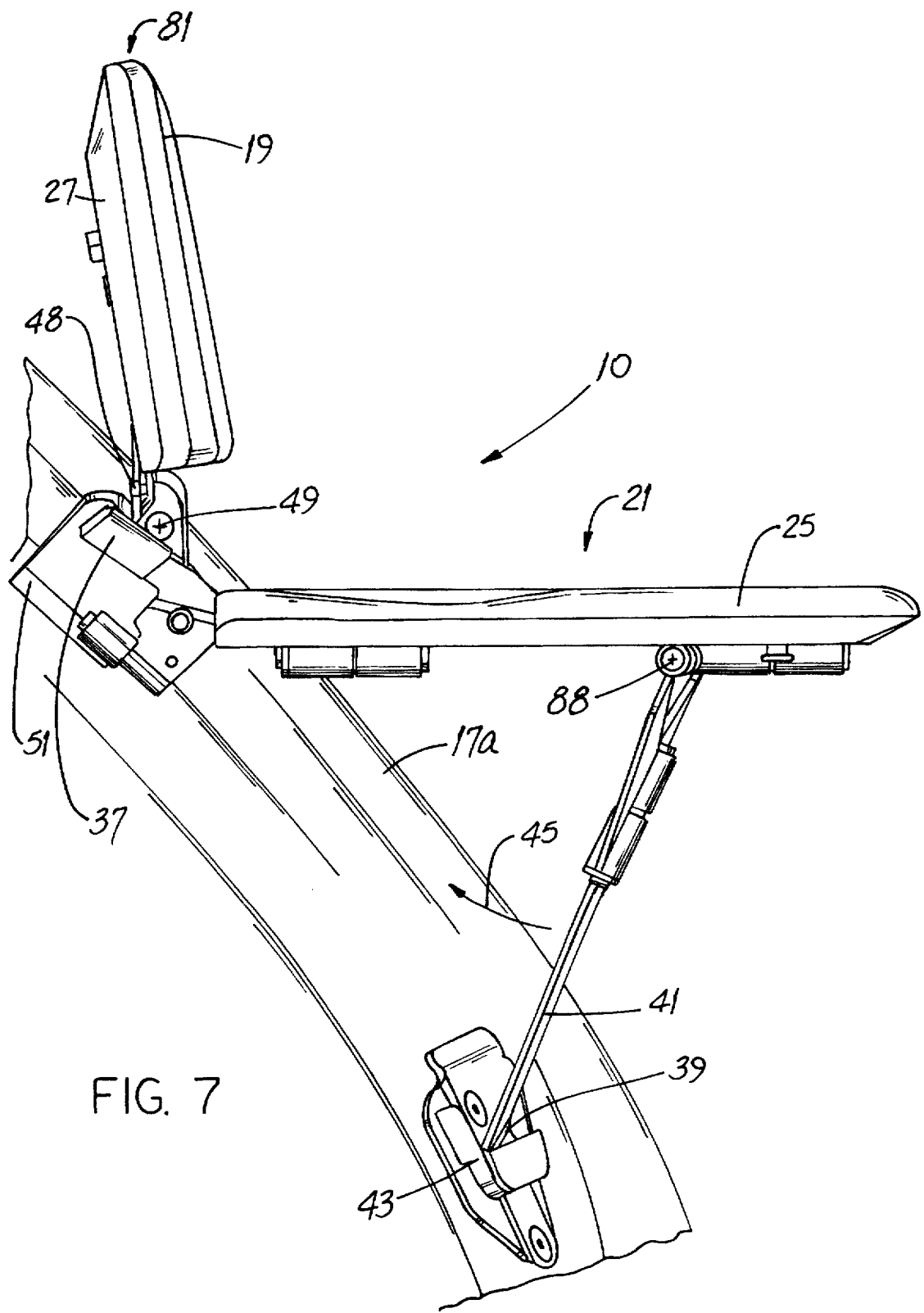
FIG. 7 is an edge view of the folding seat assembly unfolded ready for use.

While folding and unfolding the seat assembly 10 are described in greater detail below, the following brief explanation will aid understanding of the details of how the new assembly 10 is configured. It is assumed the assembly 10 is unfolded for use as shown in FIGS. 3 and 7. To fold the assembly 10, a retainer mechanism 37 is released and the seat 21 is lifted slightly upwardly until the foot 39 of the pedestal 41 is out of the pedestal support 43. When the foot 39 is clear of the support 43, the pedestal 41 is pivoted toward the rear of the tractor 11 (i.e., pivoted in the direction indicated by the arrow 45) until such pedestal 41 is generally parallel to the panels 23, 25.

Thereupon, the second panel 25 is pivoted in the direction shown by the arrow 47 until such second panel 25 is positioned below the first panel 23. When the second panel 25 is so positioned, its underside 31 is against or substantially against the underside 29 of the first panel 23.

After the second panel 25 is pivoted to be below the first panel 23, the panels 23, 25 are swung upwardly and rearwardly toward and against the back-support section 19. The panels 23, 25 and back-support section 19 are continued to be pushed rearwardly until the tab 48 contacts and rests against arms 55, thereby preventing contact of section 19 with the fender well 17a. It is to be appreciated that when folding the seat assembly 10 for stowage, the panels 23, 25 pivotally move simultaneously about the seat axis 49, even though the second panel 25 is folded against the first panel 23. After being folded for storage in that way, the folded seat 21 and back-support section 19 are secured in place by a strap 50, for example.

Referring now to the FIGURES and particularly to FIG. 8, other, more-detailed, aspects of the new seat assembly 10 will now be set forth. The primary means of attachment of the back-support section 19 and the seat 21 to the fender well 17a is an assembly mounting bracket 51 having a main portion 53 and a pair of arms 55 extending from such portion 53. The main portion 53 may be flat or shaped to fit intimately against the component (e.g., the fender well 17a) to which the assembly 10 is mounted.

The arms 55 are at right angles to the seat axis 49 and the portion 53 and each arm 55 has a respective opening 57 and 59 therethrough to receive a pin 61 extending along the seat axis 49 and through both openings 57, 59. When the pin 61 is in place, it also extends through the hinge component 63 of the back-support section 19 and the hinge components 65 of the seat 21.

A retainer mechanism 37 has a shaft 67 extending through a ferrule 69 mounted to the arm 55 which is leftward as viewed in FIG. 8. The mechanism 37 has an aperture 71 therethrough which is sized and shaped to receive the head 73 of the pin 61 with slight clearance. So configured, the retaining plate 75 is permitted to lie flat against the arm 55 when the seat assembly 10 is unfolded for use.

Referring now to FIGS. 3, 5 and 9, for folding and unfolding the seat 21, the panel 25 is mounted for pivoting movement with respect to the panel 23 by virtue of a panel hinge 77 which extends along a hinge axis 79 and couples the panels 23, 25 to one another. Whether or not the areas 33, 35 are slightly contoured for sitting, the first panel 23 and the second panel 25 are substantially coplanar when the seat 21 is unfolded for use. And as shown in FIG. 5, such areas 33, 35 are substantially parallel to one another when the seat 21 is folded for stowing. And when the seat 21 is folded, those areas 33, 35 which support the seat occupant contact one another in the highly preferred embodiment shown in the drawings.

As shown in FIGS. 5, 6, 7 and 8 as described above, the back-support section 19 is pivotally coupled to the mounting bracket 51 by the pin 61. Such back-support section 19 pivots between a first position 81 (shown in FIG. 7) for using the seat assembly 10 and a second position 83 (shown in FIGS. 5 and 6) for stowing such assembly 10.

Referring to the FIGURES and particularly to FIGS. 8 and 9, the seat first panel 23 has a component of the pedestal 41, i.e., a first plate 85, extending therefrom. That end 87 of the plate 85 which is upward when the assembly 10 is unfolded is attached to the first panel 23 by a hinge-like first plate mounting device 89 for pivoting movement about the device axis 88.

Similarly, the second panel 25 has another component of the pedestal 41, i.e., a second plate 91, extending therefrom. As further described below, the second plate 91 is mounted for pivoting movement with respect to the first plate 85.

That end 93 of the second plate 91 which is upward when the assembly 10 is unfolded is attached thereto by a second plate mounting device 95 for pivoting movement about the device axis 88. The hinge axis 79 (about which the second panel 25 pivots when folded toward and unfolded away from the first panel 23) and the device axis 88 are angular to one another. Most preferably, such axes 79, 88 are perpendicular to one another. And in a highly preferred embodiment, the seat axis 49 and the device axis 88 are slightly angular to one another to allow the seat assembly 10 to lie in the optimum position for stowage.

When the seat 21 is unfolded for use or folded for stowage, the second plate 91 pivots on a pedestal hinge 97 extending along a pedestal hinge axis 99. More specifically, pivoting of the second plate 91 on the pedestal hinge 97 occurs (and in the specific embodiment, can only occur) after the pedestal 41 is swung upwardly toward the rear of the tractor 11 in the direction indicated by the arrow 45 and is thereby positioned parallel to and flat against the panels 23, 25. The pedestal hinge axis 99 and the device axis 88 are angular to one another and in a highly preferred embodiment, are perpendicular to one another.

Another aspect of the invention involves a new method for folding an auxiliary seat assembly 10 for stowing. Such method includes providing a seat assembly 10 having a back-support section 19 and a seat 21, the latter having a first panel 23 and a second panel 25 mounted for pivoting movement with respect to the first panel 23. The second panel 25 is folded toward the first panel 23 to form a folded seat 101 as shown in FIGS. 5 and 6. The folded seat 101 is then urged toward the back-support section 19.

The back-support section 19, pivotally coupled to the above-noted mounting bracket 51, pivots between a first position 81 and a second position 83. When the back-support section 19 is at the first position 81 as a "starting" position, the method includes pivoting the back-support section 19 to the second position 83.

The seat assembly 10 includes the pivot-mounted support pedestal 41 described above and extending between the seat 21 and the vehicle component 17. In a more specific aspect of the method, the folding step is preceded by pivoting the support pedestal 41 to a position substantially parallel to the seat 21.

Such pedestal 41 includes the first and second plates 85, 91, respectively, and the folding step includes pivoting the second plate 91 toward the first plate 85. In an installation where the seat assembly 10 is attached to a vehicle component 17, the method includes urging the folded seat 101 and the back-support section 19 toward such component. Most preferably, the folded seat 101 and the back-support section 19 are then secured with respect to the vehicle component. An exemplary way of securing is by using a strap 50 across the underside of the second panel 25.

While the principles of the invention have been shown and described in connection with preferred embodiments, it is to be understood clearly that such embodiments are by way of example and are not limiting.

What is claimed:

1. In a folding seat assembly having a seat and a back-support section and wherein the seat is mounted for pivoting movement toward and away from the back-support section, the improvement wherein:

the seat is split along a fold line and includes (a) a first panel having an underside, and (b) a second panel mounted for lateral pivoting movement about a panel hinged axis generally perpendicular to the back-support section, such movement being against and away from the underside for the first panel and in directions generally parallel to the back-support section;

when the second panel is against the underside of the first panel, the second panel substantially covers the underside; and the seat and the back-support section pivot about a single seat axis.

2. The seat assembly of claim 1 wherein:

the first panel and the second panel are substantially coplanar when the seat is unfolded for use; and the first panel and the second panel are substantially parallel to one another when the seat is folded for stowing.

3. The seat assembly of claim 2 wherein:

each panel has a surface for supporting a seat occupant; and when the seat is folded for stowing, the surfaces contact one another.

4. The seat assembly of claim 2 wherein:

the back-support section is pivotally coupled to a stationary mounting bracket by a hinge component below the back support section; and the back-support section pivots between a first position for using the seat and a second position for stowing the seat.

5. The seat assembly of claim 1 wherein:

the first panel has a plate extending therefrom, said plate being attached to the first panel by a first plate mounting device for pivoting movement about a device axis; and the seat axis is spaced from the device axis.

6. The seat assembly of claim 5 wherein the seat axis and the device axis are angular to one another.

7. The seat assembly of claim 5 wherein:

the back-support section is pivotally coupled to a mounting bracket; and the back-support section pivots between a first position for using the seat and a second position for stowing the seat.

8. The seat assembly of claim 1 in combination with a vehicle component and wherein:

the assembly includes a support pedestal connected to a pedestal hinge beneath the seat and, when the seat is unfolded for use, the pedestal extends between the seat and a pedestal foot detachably bearing against a pedestal support on the vehicle component.

9. The combination of claim 8 wherein:

the pedestal includes first and second plates;

the plates pivot on first and second mounting devices, respectively; and the devices are coincident with a device axis.

10. The combination of claim 9 wherein:

the second plate pivots on a pedestal hinge extending along a pedestal hinge axis; and the pedestal hinge axis and the device axis are angular to one another.

11. The assembly of claim 1 wherein the first panel and the second panel are coupled to one another by a panel hinge which, when the seat is folded for storage, is located laterally to both of said panels.

12. The assembly of claim 11 wherein:

the second panel has a plate extending therefrom and attached thereto by a second panel mounting device for pivoting movement about a device axis; and the hinge axis and the device axis are angular to one another.

13. In a folding seat assembly having a seat and a back-support section and wherein the seat is mounted for pivoting movement toward and away from the back-support section, the improvement wherein:

the seat includes (a) a first panel, and (b) a second panel mounted for pivoting movement with respect to the first panel, such pivoting movement being about a panel hinge axis extending toward the back-support section;

the first panel has a seat support plate extending therefrom, said seat support plate being attached to the first panel by a first plate mounting device for pivoting movement about a device axis which is angled with respect to the panel hinge axis; and the panels are mounted for pivoting movement about a seat axis which is spaced from the device axis.

14. The assembly of claim 13 wherein the seat axis and the device axis are angular to one another.

15. The seat assembly of claim 13 wherein:

the back-support section is pivotally coupled to a mounting bracket; and the back-support section pivots between a first position for using the seat and a second position for stowing the seat.

16. In combination, a folding seat assembly and a vehicle component having a pedestal support, and wherein the assembly has a seat and a back-support section and wherein the seat is mounted for pivoting movement toward and away from the back-support section, the improvement wherein:

the seat includes (a) a first panel having an underside, and (b) a second panel mounted for pivoting movement against and away from the underside of the first panel;

when the second panel is against the underside of the first panel, the second panel substantially covers the underside;

the seat and the back-support section pivot about a single seat axis; and the assembly includes a support pedestal connected to a pedestal hinge beneath the seat and, when the seat is unfolded for use, the pedestal extends between the seat and a pedestal foot detachably bearing against the pedestal support.

17. The combination of claim 16 wherein:

the pedestal includes first and second plates;

the plates pivot on first and second mounting devices, respectively; and the devices are coincident with a device axis.

18. The combination of claim 17 wherein:

the second plate pivots on a pedestal hinge extending along a pedestal hinge axis; and the pedestal hinge axis and the device axis are angular to one another.

* * * * *